US008731381B2

(12) United States Patent
Hamersley

(10) Patent No.: US 8,731,381 B2
(45) Date of Patent: May 20, 2014

(54) VIRTUAL DVD ON DEMAND AND ELECTRONIC DVD RENTAL/BUY/BURN

(75) Inventor: Alan Bruce Hamersley, Newbury Park, CA (US)

(73) Assignee: Thomson Licensing, Boulogne-Billancourt (FR)

( * ) Notice: Subject to any disclaimer, the term of this patent is extended or adjusted under 35 U.S.C. 154(b) by 664 days.

(21) Appl. No.: 12/226,037

(22) PCT Filed: Jan. 16, 2007

(86) PCT No.: PCT/US2007/001062
§ 371 (c)(1),
(2), (4) Date: Oct. 6, 2008

(87) PCT Pub. No.: WO2007/117341
PCT Pub. Date: Oct. 18, 2007

(65) Prior Publication Data
US 2009/0274452 A1    Nov. 5, 2009

Related U.S. Application Data

(60) Provisional application No. 60/836,410, filed on Aug. 8, 2006.

(30) Foreign Application Priority Data

Apr. 12, 2006  (WO) ................ PCT/US2006/013732
Jun. 1, 2006   (WO) ................ PCT/US2006/021457

(51) Int. Cl.
*H04N 5/92* (2006.01)

(52) U.S. Cl.
USPC ....... 386/326; 386/226; 386/355; 348/231.99

(58) Field of Classification Search
None
See application file for complete search history.

(56) References Cited

U.S. PATENT DOCUMENTS

| | | | |
|---|---|---|---|
| 4,358,786 | A | 11/1982 | Pfleiderer et al. |
| 5,418,713 | A | 5/1995 | Allen |
| 5,794,217 | A | 8/1998 | Allen |
| 5,909,638 | A | 6/1999 | Allen |
| 6,480,188 | B1 | 11/2002 | Horsley |
| 6,591,391 | B1 * | 7/2003 | Rowenhorst et al. ......... 714/756 |

(Continued)

FOREIGN PATENT DOCUMENTS

| CN | 1349350 A | 10/2000 |
|---|---|---|
| CN | 2671261 | 1/2005 |

(Continued)

OTHER PUBLICATIONS

Intel Corporation et al.: "Content Protection for Recordable Media Specification—Network Download Book," XP002379489, Rev. 0.90, Aug. 5, 2004, pp. 3.1-3.11.

(Continued)

*Primary Examiner* — Thai Tran
*Assistant Examiner* — Girumsew Wendmagegn
(74) *Attorney, Agent, or Firm* — Robert D. Shedd; Robert B. Levy

(57) ABSTRACT

An apparatus includes a storage medium for storing downloaded encoded media content, and a decoder for decoding the stored encoded media content for a choice of one of a viewing rental of the decoded media content and recording the decoded media content to a recordable media.

13 Claims, 2 Drawing Sheets

(56) References Cited

U.S. PATENT DOCUMENTS

| | | | |
|---|---|---|---|
| 6,674,428 B2 | 1/2004 | Horsley | |
| 6,687,826 B1 | 2/2004 | Owa | |
| 6,782,190 B1 | 8/2004 | Morito | |
| 7,908,477 B2 * | 3/2011 | Eto | 713/165 |
| 2001/0015964 A1 | 8/2001 | Fuchisawa | |
| 2001/0036268 A1 | 11/2001 | Kuroda et al. | |
| 2002/0056118 A1 | 5/2002 | Hunter et al. | |
| 2002/0062357 A1 | 5/2002 | Srinivasan | |
| 2002/0078176 A1 * | 6/2002 | Nomura et al. | 709/219 |
| 2002/0184490 A1 | 12/2002 | McCown et al. | |
| 2002/0199205 A1 | 12/2002 | Sonawane et al. | |
| 2003/0009668 A1 * | 1/2003 | Chan et al. | 713/171 |
| 2003/0036974 A1 | 2/2003 | Allen | |
| 2003/0135467 A1 | 7/2003 | Okamoto | |
| 2003/0142959 A1 * | 7/2003 | Qu | 386/94 |
| 2003/0147339 A1 | 8/2003 | Selinfreund et al. | |
| 2003/0152368 A1 | 8/2003 | Kitani | |
| 2003/0152369 A1 | 8/2003 | Isobe et al. | |
| 2003/0155417 A1 | 8/2003 | Fairman | |
| 2004/0162779 A1 | 8/2004 | Kramer | |
| 2004/0165498 A1 * | 8/2004 | Masaaki et al. | 369/47.39 |
| 2004/0225575 A1 | 11/2004 | List et al. | |
| 2004/0246866 A1 | 12/2004 | Sato et al. | |
| 2004/0267790 A1 | 12/2004 | Pak et al. | |
| 2005/0010790 A1 | 1/2005 | Lang et al. | |
| 2005/0049931 A1 | 3/2005 | Wisnudel et al. | |
| 2005/0050571 A1 | 3/2005 | Wisnudel et al. | |
| 2005/0154682 A1 | 7/2005 | Taylor | |
| 2005/0204019 A1 | 9/2005 | Flynn et al. | |
| 2005/0204398 A1 | 9/2005 | Ryal | |
| 2006/0031916 A1 * | 2/2006 | Colter et al. | 725/135 |
| 2006/0078111 A1 * | 4/2006 | Hollar | 380/201 |
| 2007/0166014 A1 * | 7/2007 | Schwarzmann | 386/125 |
| 2007/0198855 A1 | 8/2007 | Kuroda et al. | |
| 2007/0206732 A1 | 9/2007 | Ito et al. | |
| 2007/0230297 A1 | 10/2007 | Kitani | |
| 2009/0245055 A1 | 10/2009 | Hamersley et al. | |

FOREIGN PATENT DOCUMENTS

| | | |
|---|---|---|
| CN | 2671261 Y | 1/2005 |
| EP | 1148488 | 10/2001 |
| EP | 1302882 | 4/2003 |
| EP | 1353330 | 10/2003 |
| EP | 1226717 | 7/2004 |
| FR | 2851666 | 8/2004 |
| FR | 2860904 | 4/2005 |
| JP | 11175539 | 7/1999 |
| JP | 11242569 | 9/1999 |
| JP | 11250572 | 9/1999 |
| JP | 200076141 | 3/2000 |
| JP | 2000113589 | 4/2000 |
| JP | 2001307427 | 11/2001 |
| JP | 2002-152658 | 5/2002 |
| JP | 2005018931 | 1/2005 |
| JP | 2005-267669 | 9/2005 |
| JP | 2006185304 | 7/2006 |
| JP | 5078897 | 3/2009 |
| KR | 20010018364 | 3/2001 |
| KR | 20010035324 | 5/2001 |
| WO | WO9735311 | 9/1997 |
| WO | WO9935753 | 7/1999 |
| WO | WO0120907 | 3/2001 |
| WO | WO0193134 | 12/2001 |
| WO | WO0205128 | 1/2002 |
| WO | WO03036641 | 5/2003 |
| WO | WO03058618 | 7/2003 |
| WO | WO2005024608 | 3/2005 |
| WO | WO2005024811 | 3/2005 |
| WO | WO2005034422 | 4/2005 |
| WO | WO2005050907 | 6/2005 |
| WO | WO2005079369 | 9/2005 |
| WO | WO2005122164 | 12/2005 |
| WO | WO2007/044070 | 4/2007 |
| WO | WO2007/044092 | 4/2007 |
| WO | WO2007117341 | 10/2007 |

OTHER PUBLICATIONS

Business Wire: Mix & Burn Selects SyncCast Technology to Advance CD-Burning Music Kiosk; Extensive Catalogs of Major Label Content Enhance the Retail Music Experience, Jul. 28, 2005, Source: Newswire.

International Search Report, dated Jun. 19, 2007.

Non-Final Office Action from U.S. Appl. No. 12/083,273 mailed Jan. 25, 2012.

Bennett,"Understanding Recordable & Rewritable DVD". Optical Storage Technology Association, First Edition, Apr. 2004.

Business Wire: Mix & Burn Selects SyncCast Technology to Advance CD-Burning Music Kiosk;Extensive Catalogs of Major Label Content Enhance Retail Music Experience,Jul. 28, 2005.

Carson et al:"Complete CSS Testing on DVD-Video Discs", Datarius Group, White Paper. May 2004.

Digipoints: "The Digital Knowledge Handbook," vol. III, Issue 9, Jul. 27, 2000, DVD, Part Two.

Kesden: "Content Scrambling System (CSS) Introduction" Lecture 33, Course: 15-412, Dec. 6, 2000.

* cited by examiner

VIRTUAL DVD ON DEMAND AND ELECTRONIC DVD RENTAL/BUY/BURN

CROSS-REFERENCE TO RELATED APPLICATIONS

This application claims the benefit, under 35 U.S.C. §365 of International Application PCT/US2007/001062 filed Jan. 16, 2007 which was published in accordance with PCT Article 21(2) on Oct. 18, 2007 in English and which claims the priority of PCT application No. PCT/US2006/013732 filed Apr. 12, 2006, PCT/US2006/021457 filed Jun. 1, 2006, and U.S. provisional patent application No. 60/836,410 filed Aug. 8, 2006, which are incorporated by reference herein in their entirety.

FIELD OF THE INVENTION

The present invention generally relates to downloading of media content and more particularly to download, rental and playback of media content with full digital versatile disc DVD functionality.

BACKGROUND OF THE INVENTION

Known downloading and burning of a digital versatile disc DVD does not teach electronic rental of DVD content. Previous teachings of burning downloaded content do not contemplate pre-encoding the data prior to downloading the content. Therefore these downloaded files cannot be played back directly by emulation from a hard disc. Other known approaches to burning downloaded content perform some or all of the following functions prior to having the downloaded data in a form such that standard DVD circuitry could decode and playback or record the DVD content: transcoding, authoring, file manipulation, CSS encryption and DVD formatting (error detection/correction coding, scrambling and eight-to-sixteen modulation). The prior art does not teach performing the encoding and encryption processes in advance, either partially or fully and prior to downloading, such that the DVD content can be directly played back or recorded to recordable media. Eliminating conversion processes or encoding processes required by the user's set-top box hardware or software can achieve cost savings for the for the set-top box manufacturer and time saved for the consumer. Additionally, downloaded content must be capable of CSS copy protection, just as a standard replicated DVD is CSS copy protected in a CSS licensed facility.

Accordingly, there is a need for electronic download, rental and playback of entertainment content in a manner normally only experienced by direct playback content from an optical disc such as a digital versatile disc DVD. There should be random access of the electronic version of the data contained, on a DVD from the HDD that would allow full DVD functionality, including all the added value content and interactive features available on a DVD. DVD rental should be capable of being performed directly, from the home without having to visit a retail establishment. An improved option for electronic rental of DVD content compared to existing solutions or solutions becoming available in the marketplace is needed.

SUMMARY OF THE INVENTION

A method includes storing downloaded encoded media content and decoding the stored encoded media content for one of a viewing rental of the decoded media content and recording the encoded media content to a recordable media.

An apparatus includes a storage medium for storing downloaded encoded media content, and a decoder for decoding the stored encoded media content for a one of a viewing rental of the decoded media content and recording the encoded media content to a recordable media.

BRIEF DESCRIPTION OF THE DRAWINGS

The advantages, nature, and various additional features of the invention will appear more fully upon consideration of the illustrative embodiments now to be described in detail in connection with accompanying drawings wherein.

It should be understood that the drawings are for purposes of illustrating the concepts of the invention and are not necessarily the only possible configuration for illustrating the invention.

DETAILED DESCRIPTION OF THE INVENTION

Figure 1:
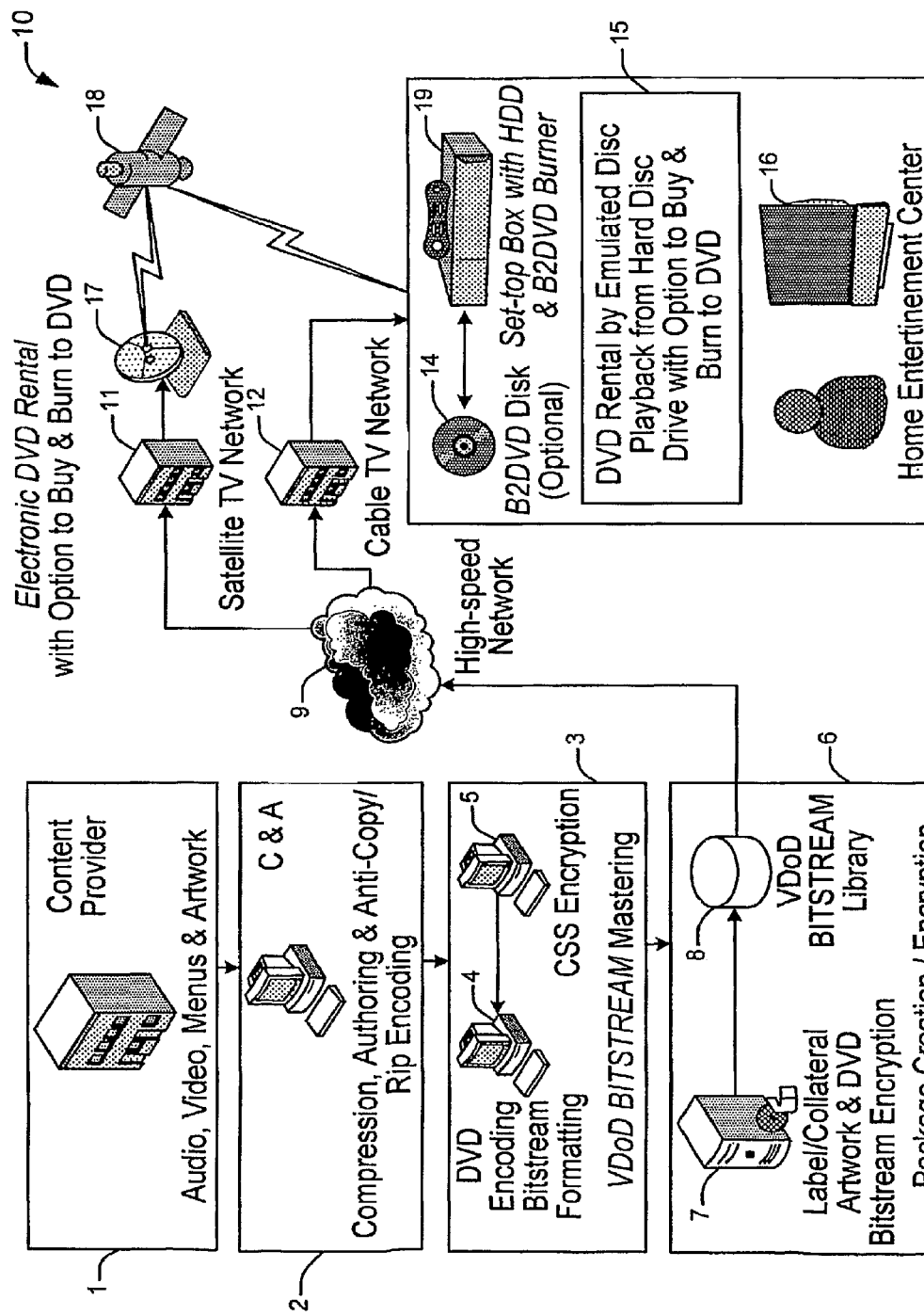
FIG. 1 is a schematic diagram of an exemplary electronic DVD rental model in accordance with the present invention.
Figure 2:
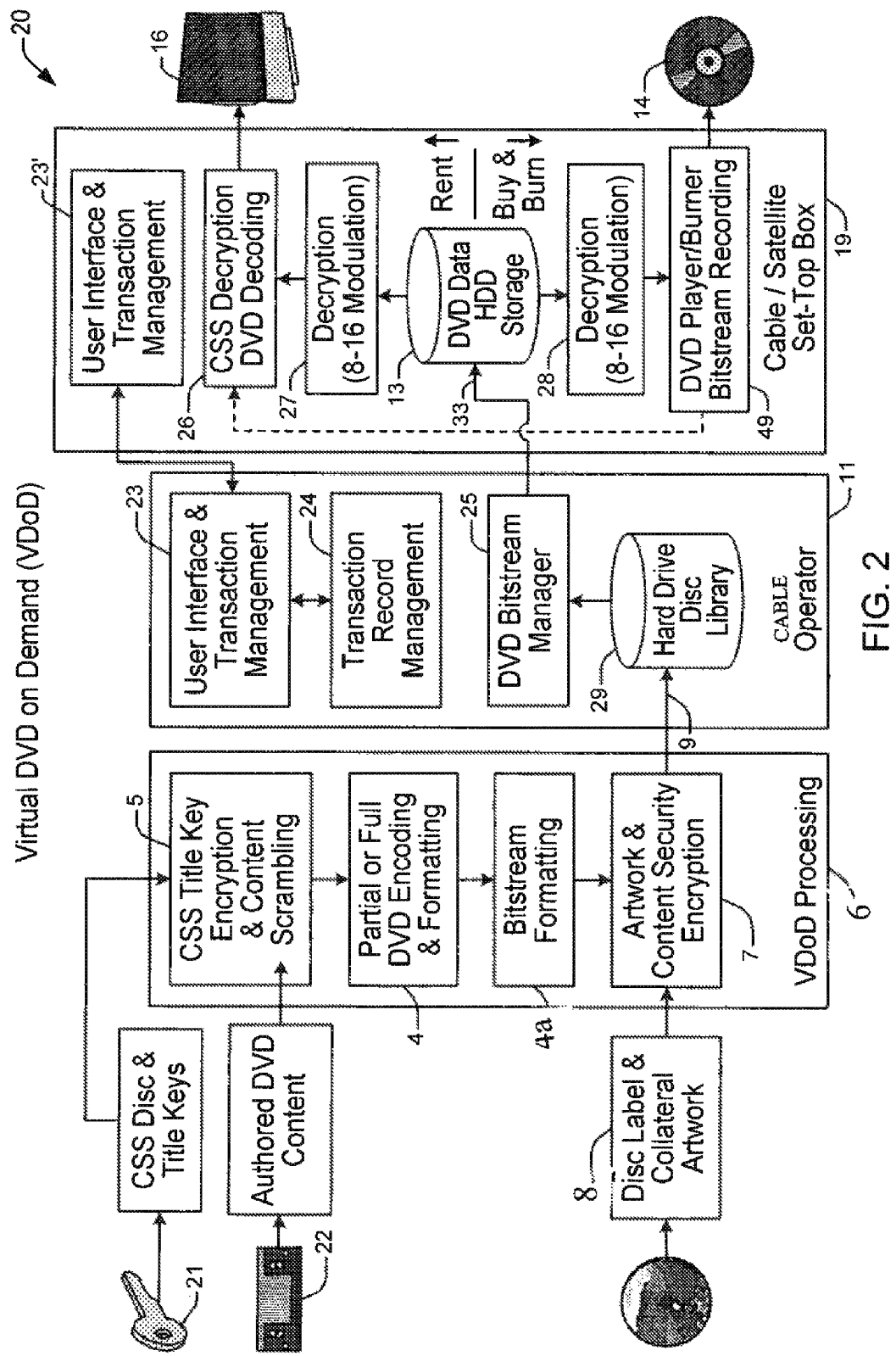
FIG. 2 is block diagram of virtual video on demand VDoD in accordance with the present invention.

Referring now in specific detail to the drawings in which, like reference, numerals identify similar or identical elements throughout the several views. The schematic diagram 10 of FIG. 1 is an exemplary embodiment of electronic DVD rental in accordance with the invention. The diagram 20 of FIG. 2 is block diagram of virtual video on demand VDoD in accordance with the invention. It should be further understood that the elements shown in the Figures can be implemented in various forms of hardware, software or combinations thereof. Preferably, these elements are implemented in a combination of hardware and software on one or more appropriately programmed general-purpose devices, which may include a processor, memory and input/output interfaces.

The invention is directed to facilitating a consumer to rent and playback 15,49 an electronic version of a DVD by downloading to a local hard disc drive (HDD) 13,19 a pre-encoded DVD disc image through cable 12, satellite 11,17,18, Internet or other electronic connection 9 for subsequent direct playback from local HDD by use of standard DVD decoding circuitry 26. For example, the playback of a DVD video disc is emulated by decoding downloaded, encoded DVD data stored on a local HDD instead of decoding the encoded data on an actual DVD disc. The technology can be termed Virtual DVD on Demand (VDoD) or electronic DVD rental. The downloaded VDoD file is an identical bit-for-bit representation of what would be stored on a standard replicated DVD-Video disc. According, to a variable pricing structure, the consumer can chose from variable rental plans and can have the option, at any time, to Buy and Burn the content 15 to a recordable disc such as a recordable DVD 14. A rental fee can be fully or partially applied toward the purchase of the right to burn a copy of the DVD.

The consumer experience is identical to that produced by playing a standard DVD-Video disc. The consumer would have access to the full interactivity, menus, extras, value added content, languages, subtitles and other options as experienced by playback of a standard replicated DVD-Video Disc played back in a standard DVD player. The look, feel and responsiveness can be identical to that experienced by playback of a standard replicated DVD-Video Disc. Single layer or dual layer content can be emulated for playback. This invention has application toward other types of optical discs such as, but not limited to HD DVD and Blu-ray.

DVD content can be stored onto or "pushed" to a consumer's hard disc, drive 13 located in a cable set-top box 19, satellite set-top box 19 or PC for offer to rent or buy and burn to DVD 15, in which case the consumer would have instant access to the electronic version of the DVD. Conversely, content can be downloaded or "pulled" by the consumer through an interactive ordering process 23,23' for delivery through applicable electronic connection 9,11,12,17,18. Once the electronic version of the DVD is transferred to local hard disc drive storage 13, the content can be viewed 16 directly from hard disc or can be burned to a local DVD recorder 19,49.

Standard authoring and compression 2 techniques are used to prepare DVD master files. The DVD master files are optionally encrypted 5 according to the Content Scrambling System or CSS standard for DVD-Video. Other anti-copy and anti-rip protection can be added in the authoring process.

FIGS. 1 and 2 detail how content is delivered as a fully or partially DVD encoded file that may contain content that has been copy protected by the DVD-Video format standard called Content Scrambling System (CSS) 5 and/or any other ancillary anti-copy or anti-rip technology. The virtual video on demand VDoD digital versatile disc DVD file is an identical bit-for-bit representation of what would be stored on a standard replicated DVD-Video disc. The DVD file is received into the set-top box 19 or PC and stored to an integral hard disc drive 13. For rental of the DVD, the encoded DVD data is streamed to standard DVD decoding circuitry for subsequent output and playback of the video and audio information. For purchase of the DVD, the encoded DVD data is streamed to a specialized DVD recorder 49 that can stream the fully encoded DVD content directly to recordable DVD media 14. The consumer may choose to Buy and Burn the content to recordable DVD media after previous viewing through rental ("Try It→Buy It") 15.

Following is a description an implementation of the invention using CSS encryption 5 and partial encoding. This embodiment of the invention provides preprocessed CSS copy protection encryption 21 for the DVD content and the partial encoding resulting in a smaller sized package for download delivery to the consumer.

The content owner prepares audio, video, navigation flowcharts, graphics and other ancillary information 12 that is to be included in final DVD image to be used for the VDoD rental process for transfer to a compression and authoring facility 2.

The authoring and compression facility 2 performs compression of audio and video. Menus, subtitles and other ancillary information are configured for DVD and final navigational programming performed. Optional anti-copy or anti-rip programming is added to content and the final file set is prepared for delivery to VDOD processing center 3.

Content is received at a VDOD Mastering Center 3. The Mastering Center can be a DVD replication, compression and authoring facility or other facility that is licensed to perform Content Scrambling System (CSS) copy protection encryption. The following steps take place in the VDOD Mastering Center.

a) As with normal replication processing, the processing center chooses CSS Disc Keys 5,21 for delivery to DVD CCA for encryption and return to the VDoD Mastering Center.

b) The encrypted disc key is used to encrypt the disc title key 5,21. After the content is encrypted by the title key, the title key gets encrypted by the disc key and then the disc key gets encrypted. (Note: CSS or other types of encryption are optional).

c) The data is then broken into sectors, the sectors (up to 50%) are then CSS scrambled 5, and DVD formatted 4.

d) DVD Error Detection Codes (EDC) and Error Correction Codes (ECC) are then generated.

e) The normal DVD encoding process would now transform the eight bit data bytes into 16 bit words or symbols. This process is not performed at this step in order to reduce the data file size and as an extra security function because these partially encoded and formatted DVD files are not directly usable to produce DVD-Video discs.

f) Lead-In area and lead-out then may be appended to the data. Bit stream formatting 4a is used to prepare the resultant eight bit bytes into a VDoD bit stream. The VDoD bit stream is then transferred to hard disc for storage.

g) Video on demand VDoD bit stream data files are then archived to suitable media for delivery to a central package processing and distribution center 6.

h) The DVD content formatting process is identical to that used in normal DVD-Video replication processes except for the optional elimination of the final eight-to-sixteen modulation process 27,28 and the VDOD Bit Stream formatting 4 process.

i) Optionally, watermarking or watermark tagging of the audio and/or video information may be added at this stage or in the authoring stage 22.

The "VDoD Bit Stream" archived data files are delivered to the Distribution Center 6 for package creation and security encryption. The Distribution Center performs the following functions:

a) The complete video on demand VDoD package, for delivery to the consumer, is created by adding disc label artwork, collateral material artwork 7 and other ancillary information such as authentication data and rental control information. The artwork and VDoD DVD data are generally stored 8 as separate files.

b) The VDoD package is security encrypted with suitable encryption software 5, stored in the VDoD package library 8 server system and can be archived to a suitable medium. This encryption is a secondary encryption which may include copy protection for recordable media (CPRM) or other suitable encryption software. This secondary encryption does not include CSS encryption.

The distribution center performs the management of the inventory and delivery of the VDoD packages to the satellite 11, cable operators 12 or Internet providers. Transfer of the VDoD packages can be performed either electronically 9 or by physical means.

The satellite 11, cable operator 12 or Internet provider receives the VDoD packages and loads them to local hard disk drive HDD storage 29 such that they are available for download delivery and rental.

a) The satellite 11, cable operator's 12 or Internet provider's central operations center provides the means for consumer interaction and ordering of VDoD DVD files through a user interface 23,23'. The central operations center also provides the necessary transaction management services 23,23', 24.

b) Upon receipt of a consumer VDoD order, the central operations center will electronically transfer the associated VDOD package to the consumer's set-top box 19 or PC.

c) As an alternate solution, the central operations center can "Push" or drop chosen titles to the consumer's set-top box 19 or PC for availability and marketing to the consumer to purchase for rent or for sale and burn to DVD 15.

The VDOD content is received to the user's set-top box 19 and is stored to the device's local HDD 13 as a VDoD package of files.

Playback of the rental DVD is initiated by the consumer and can be accomplished through the following process:

i) The VDoD file and the artwork files are security decrypted using a suitable, decryption algorithm 26.

ii) The final encoding process step, eight-to-sixteen modulation 27 is performed through software or hardware implementation.

iii) The DVD data is fed as a bit stream to standard DVD decoding circuitry 26 that may be located in the set-top box's resident DVD player/recorder 49 or the DVD decoding circuitry may be located on a circuit board located in the set-top box 19.

iv) The disc label artwork and the collateral material artwork stored in the VDoD package's files can be viewed on a display or the user's television 16.

v) The associated standard DVD decoding circuitry can also be used for decoding DVD content played back from the local DVD player/recorder 49.

Purchase of the DVD or Buy & Burn of the DVD is accomplished through the following process:

i) The VDoD file and the artwork files are security decrypted using a suitable decryption algorithm 26.

ii) The final encoding process step, eight-to-sixteen modulation 28, is performed through software or hardware implementation.

iii) The DVD data is fed as a bit stream to a specialized Downloadable DVD (D-DVD) recorder/player 49 that is resident in the set-top box 19.

iv) The disc can be printed with the label artwork located in the VDoD package artwork files. Additional collateral artwork can also be printed from the VDoD package artwork files.

v) The resultant DVD disc 14 can be played back on the set-top box's DVD player 19 or on a standard DVD player device such as a set-top DVD player or on a DVD player located in a PC.

Having described preferred embodiments for video downloading on demand with options to rent or buy and burn (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

The invention claimed is:

1. A content receiving apparatus comprising:
a storage medium within the content receiving apparatus for receiving and storing downloaded partially-encoded media content established after content mastering from a content provider, the partially-encoded media content not being directly usable to replicate the media content;
means within the content receiving apparatus for completing final eight-to-sixteen modulation of the partially encoded media content established after content mastering to complete encoding thereof at the content receiving apparatus for subsequent storage on the storage medium;
a decoder within the content receiving apparatus for decoding the encoded media content stored on the storage medium for viewing of the decoded media content and;
a device within the content receiving apparatus for recording the encoded media content to recordable media.

2. The content receiving apparatus of claim 1, wherein the content receiving apparatus comprises a set-top box and wherein the storage medium comprises a hard disk drive within the set-top box.

3. The apparatus of claim 2, wherein the recording device is a digital versatile disc (DVD) recorder within the set-top.

4. The content receiving apparatus of claim 1, wherein the viewing of the decoded media content is by emulated by disc playback of content from the storage medium with an option to record the encoded media content upon purchase of the encoded media content.

5. A method comprising the steps of:
storing at a content receiving device downloaded partially-encoded media content established after content mastering from a content provider, the partially-encoded media content not being directly usable to replicate the media content; completing, at a content receiving device, final eight-to-sixteen modulation of the partially encoded media content established after content mastering to complete encoding thereof; and
decoding the stored encoded media content at a content receiving device for one of a viewing rental of the decoded media content and recording the encoded media content to a recordable media.

6. The method of claim 5, wherein the storing and decoding steps are performed by a set-top box as the content receiving device, the set-top box including a hard disk drive having a storage medium for storing the downloaded partially-encoded media content.

7. The method of claim 5, wherein the recording of the encoded media content is with a DVD digital video disc recorder.

8. The method of claim 6, wherein the viewing of the decoded media content occurs by emulating an optical disc playback from the storage medium with an option to record the media content.

9. The method of claim 5, wherein the downloaded partially-encoded media content is encrypted by one or more forms of encryption.

10. The method of claim 9, wherein the one or more forms of encryption comprises one of Content Scrambling System and copy protection for recordable media.

11. The method of claim 5, wherein the encoded media content is digital versatile disk DVD data and the decoding step includes DVD decoding.

12. The method of claim 5, wherein the recording of the encoded media content to a recordable media includes streaming the encoded media content as encoded digital versatile disc DVD data to a DVD device.

13. The method of claim 12, wherein the recording of the encoded media content to a recordable media is enabled after a purchase of the encoded DVD data.

* * * * *